United States Patent [19]
Piliero et al.

[11] Patent Number: 5,330,773
[45] Date of Patent: Jul. 19, 1994

[54] PROCESS FOR MAKING CHEESE OR A CHEESE-RELATED SPECIALTY

[75] Inventors: Rocco Piliero, Aze; Nicolas Meugniot, Entrammes, both of France

[73] Assignee: Bongrain S.A., Guyancourt, France

[21] Appl. No.: 905,128

[22] Filed: Jun. 24, 1992

Related U.S. Application Data

[63] Continuation of Ser. No. 663,556, filed as PCT/FR90/00631, Aug. 27, 1990, published as WO91/03164, abandoned.

[30] Foreign Application Priority Data

Aug. 29, 1989 [FR] France ................. 89 11347

[51] Int. Cl.$^5$ ............................................. A23C 9/12
[52] U.S. Cl. .................................. 426/36; 426/38; 426/39; 426/40; 426/576; 426/582
[58] Field of Search ................ 424/36, 34, 37, 38, 424/39, 40, 41, 42, 43, 582, 334, 330.2, 575, 576

[56] References Cited

U.S. PATENT DOCUMENTS

| | | | |
|---|---|---|---|
| 3,012,889 | 12/1961 | Angerer et al. | 426/36 |
| 4,427,701 | 1/1984 | Morley | 426/36 |
| 4,534,982 | 8/1985 | Yoshida et al. | 426/36 |
| 4,683,533 | 8/1987 | Kratochvil | 426/602 |
| 4,684,533 | 8/1987 | Kratochvil | 426/575 |
| 4,749,584 | 6/1988 | Wirchansky et al. | 426/36 |
| 4,911,935 | 3/1990 | Fillaud et al. | 426/36 |
| 5,080,913 | 1/1992 | Gamay | 426/39 |

FOREIGN PATENT DOCUMENTS

| | | |
|---|---|---|
| 0229078 | 11/1986 | European Pat. Off. |
| 925031 | 5/1963 | United Kingdom ........... 49/B14 |
| 2072481 | 10/1981 | United Kingdom |
| 8605363 | 9/1986 | World Int. Prop. O. |

OTHER PUBLICATIONS

"Effects of Polysaccharides on Rennet Coagulation of Skim Milk Proteins", Journal of Diary Science, vol. 72, No. 7 (Jul. 1989), pp. 1695–1700.
Journal of Food Science, vol. 53, No. 6, Nov.-Dec. 1988, pp. 1680–1683.
M. A. Craddock et al., "Evaluation of Alternative Methods to Increase Calcium Retention in Cottage Cheese Curd".
Food Science and Technology Abstracts, No. 87-0-6-P0091 (97034132); A. A. Elnesway.
"An Attempt to Produce Lowfat Cephalstyre (RAS) Cheese of Acceptable Quality" & Food Chemistry, vol. 22, No. 2, pp. 123–137, 1986 Abrege.
Food Science & Technology Abstracts No. 80-03, P06 03 (80015984); H. M. Galeb, "Contriubtion to Loss of Domanti Cheese During Pickling II. Cheese Milk Treatments B. Use of Pectin, Gelatin and Agar".
Food Science & Technology Abstracts No. 79-0-9-P1510 (19051912); W. M. Abou-El-Ella; "Studies on Soft Cheese with Low Fat and Salt Contents".

*Primary Examiner*—Donald E. Czaja
*Assistant Examiner*—Leslie Wong
*Attorney, Agent, or Firm*—Vickers Daniels & Young

[57] ABSTRACT

A process for making a cheese food product wherein a gelatin solution selected from the class consisting of carragenates, gelatin, guar, carob and xanthan or any mixture thereof is added and dispersed in as homogeneous manner as possible into an ultrafiltered low fat milk or milk residue to produce a milk blend wherein the milk blend is maintained at a temperature in which gelling does not occur within the milk blend, adding an activator such as a lactic acid to the milk blend; molding the milk blend to produce a paste and then subsequently, draining, brining and ripening the paste. During the ripening of the paste, the pH is maintained below or equal to 5 throughout at least ¾ of the composition of the cheese product. The resulting low fat cheese product has a fat content relative to the dry matter of less than or equal to 50%.

9 Claims, No Drawings

5,330,773

PROCESS FOR MAKING CHEESE OR A CHEESE-RELATED SPECIALTY

This is a continuation of Ser. No. 663,556 filed as PCT/FR90/00631, Aug. 27, 1990, and published as WO91/03164, now abandoned.

FIELD OF THE INVENTION

The invention relates to a process for making cheese or a cheese-related specialty and to the cheese or cheese-related specialty obtained by implementation of the process.

Current trends are aimed at seeking to develop and produce cheeses or cheese-related specialties which are low in fat, that is to say whose fat content, relative to the dry matter, is less than or equal to 30 %, and this in order to satisfy consumer expectations for products with reduced fat contents.

PRIOR ART

Various cheeses or cheese-related specialties are known today which satisfy this criterion of having a low-fat or reduced-fat content. In a first variant, the cheese or cheese-related specialty has a homogeneous paste and a rennet curd. In a second variant, the cheese or cheese-related specialty has a lactic acid or mixed curd, a non-homogeneous paste, and undergoes a conventional ripening which can lead to a proteolysis below the rind. However, although such a cheese or cheese-related specialty according to this second variant has the advantage of having a lactic acid curd, it has precisely the double disadvantage of being perceived, to the taste, as insufficiently homogeneous and of being highly evolutive and runny, which is unacceptable, for example, for products offered for sale in slices. Moreover, this type of cheese or cheese-related specialty is subject to two phenomena or tendencies or has two characteristics which are opposed or antinomic: the ripening and the presence as well as the perception by the consumer of the heterogeneity in grain or module form. If the ripening is light, the consistency is chalky, the sense of heterogeneity is considerable, and swallowing is made difficult for this reason. On the other hand, running is avoided. If, in contrast, the ripening is extensive, the homogeneity seems better but, on the other hand, the cheese or the cheese-related specialty runs.

The problem concerning the perception of homogeneity of the cheese or of the cheese-related specialty and its strength in the mouth can be attenuated by a greater fat content, but the cheese or the cheese-related specialty loses the low-fat or reduced-fat quality, which is exactly the quality sought.

SUMMARY OF THE INVENTION

The invention aims to overcome these problems. To this end, it proposes a process for making a cheese or a cheese-related specialty, wherein, before coagulation of the milk or milk residue originating from ultrafiltration, there is added and dispersed in the composition, in as homogeneous a manner as possible, a solution of at least one compound chosen from the group consisting of carragenates, gelatin, guar, carob or xanthan or their mixture, at a temperature at which this solution does not form a gel, and the process for making the cheese or the cheese-related specialty is then continued, the role of the carragenates, gelatin, guar, carob and xanthan thus used being to give the consumer an impression of homogeneity and of freshness of the paste thus manufactured.

According to a preferred variant, the process according to the invention is implemented using a soft paste with lactic acid curd and surface mold, which is low in fat, having a fat content, relative to the dry matter, of less than or equal to 50 %, lightly ripened so that the pH is less than or equal to approximately 5 over approximately ¾ of the composition of cheese or cheese-related specialty.

One of the main aims of the invention is therefore to produce a cheese with a soft paste, lactic acid rind and surface mold, which is low in fat and is not too strong-tasting in the mouth for the consumer, and gives, upon tasting, an impression of homogeneity as well as of freshness such as that given by a fresh cheese, can be easily sliced without running excessively, in such a way that it can also be conveniently offered for sale in slices. Moreover, the gelatin limits the exudation of the product.

This aim is achieved according to the invention by addition of alginate, carragenate and, preferably, gelatin.

The literature provides a certain amount of teaching on the use of gelatin in agri-foodstuffs: the document EP 0,033,635 describes the production of a cheese cream of the process type, using gelatin for its quality as a stabilizing agent. The document FR 1,225,769 proposes using gelatin associated with other elements as a material for coating grain substances, such as rice, coffee, barley. The document U.S. Pat. No. 4,197,325 provides teaching on the production of Jellies. The document U.S. Pat. No. 4,272,587 describes a dessert comprising gelatin stable at low temperature. The document BE 511,832 relates to a casing for sausage, salami or the like, comprising, together with other products, gelatin. The document U.S. Pat. No. 3,669,688 describes an edible stabilizing composition which can be used for coating cakes and comprises gelatin. The document WO 86065363 describes a colored food composition which can contain gelatin and can be used as decoration. The document JP 7,927,780 discloses the use of gelatin for a food composition for coating with a view to ensuring a suitable consistency. The document DE 653,344 claims the application of gel on a fresh cheese, the ripening taking place totally after this coating with the gel. The document DE 626,383 describes the production of a pectin envelope on a process cheese and demonstrates the disadvantages of the use of gelatin. The document EP 86902849.8 concerns the use of gelatin or the like on the surface of a lightly ripened product.

In contrast, the prior art has not demonstrated the application of gelatin as a factor able to give a cheese or a cheese-related specialty an impression of homogeneity and freshness, and this particularly in the case of a soft paste, with a lactic acid rind and surface mold, which is low in fat, having a fat content, relative to the dry matter, of less than or equal to 50%, and which is lightly ripened so that the pH is less than or equal to approximately 5 over approximately ¾ of the composition of cheese or cheese-related specialty.

The process additionally comprises the step of adding and dispersing the solution of carragenate, gelatin, guar, carob and xanthan, and the successive steps of adding lactic acid bacteria, molding, draining, brining and ripening. These different steps are conventional in cheese-making technology for making cheese or cheese-related specialties. It is not therefore necessary to describe them further. In contrast, it must be demonstrated that the addition step according to the invention fits in with the process for making a cheese or a cheese-related specialty.

The solution of carragenate, gelatin, guar, carob and xanthan is preferably an aqueous solution or in a suitable solvent.

DESCRIPTION OF THE PREFERRED EMBODIMENTS

According to a preferred variant, the process is implemented using a lactic acid or mixed curd. Cheeses or cheese-related specialties with a lactic acid curd are understood to mean those which undergo a slight rennet action and a strong acidification before draining. Cheeses or cheese-related specialties with a mixed curd are understood to mean those which are obtained from a mixed coagulum or, sometimes, with rennet tendency in which case a significant acidification takes place during draining (example: pasteurized Camembert).

According to another possible variant, the process is implemented with a rennet curd, the cheeses or cheese-related specialties of this type being those obtained with a slightly cultured milk, the acidification occurring in a limited and delayed manner at the end of draining (example: Cantal).

The process according to the invention can be implemented preferably with a cheese or cheese-related specialty having a soft paste, but also, where appropriate, with a fresh or white, veined paste, or else a goat's milk cheese or cheese-related specialty.

Also, the process is preferably implemented with a cheese or cheese-related specialty with washed or mixed surface mold.

The notions or concepts of "lactic" "rennet", "fresh", "white" "soft" "veined" paste and "surface mold" are well-known per se to the person skilled in the art and do not require further explanations.

The process according to the invention is preferably implemented for a low-fat cheese or cheese-related specialty having a fat content, relative to the dry matter, of less than or equal to 50 %. Indeed, for cheeses or cheese-related specialties of low-fat or reduced-fat content, the function of the gelatin as an agent able to give an impression of homogeneity to the consumer is particularly sensitive, especially if at the same time the ripening is light, as is mentioned hereinbelow.

Also, the process can comprise and preferably comprises a light ripening step so that the pH is less than or equal to approximately 5 over approximately ⅔ of the composition of cheese or cheese-related specialty. Such a light ripening must be distinguished from extensive or complete ripening, such as that implemented in the case of a cheese or cheese-related specialty of the Camembert type. The conditions (duration, temperature) of such a light ripening can be subject to variants depending on the cheese or cheese-related specialty made. They are defined as a function of the desired effect, that is to say a limited pH in a substantial part of the composition of cheese or cheese-related specialty and the absence of proteolysis below the rind.

The solution of carragenate, gelatin, guar, carob and xanthan can be added and dispersed on and in the milk or milk residue originating from ultrafiltration substantially at the same time as the lactic acid bacteria, at a temperature greater than or equal to approximately 20° C. in such a way as to be sufficiently fluid and not to form a gel.

As emerges from the above, the process according to the invention has been implemented, with excellent test results, in the case where there is simultaneously obtained a soft paste with a lactic acid curd, surface mold and which is low in fat, having a fat content, relative to the dry matter, of less than or equal to 50%, and which is lightly ripened so that the pH is less than or equal to approximately 5 over approximately ⅔ of the composition of cheese or cheese-related specialty. In such a case, the use of gelatin as an additive has given excellent results.

The invention also relates to the cheese or the cheese-related specialty obtained by implementation of the process.

We claim:

1. A process for making a low fat cheese or low fat cheese specialty from a low fat milk or a low fat milk residue, wherein said final cheese or cheese specialty has an impression of homogeneity and freshness without having a chalky consistency or aftertaste and can be sliced, said process comprising the steps of:
   a) ultrafiltrating said low fat milk or low fat milk residue to produce a low fat milk liquor;
   b) adding and dispersing a gelatin solution into said low fat milk liquor in as homogeneous manner as possible to produce a low fat milk blend, said milk blend maintained at a temperature greater than or equal to 20° C. to prevent said gelatin solution from solidifying during dispersion in said milk liquor, said gelatin solution selected from the group consisting of carrageenates, gelatin, guar, carob, xanthan or mixtures thereof;
   c) adding a starter to said low fat milk blend to produce a low fat paste, said starter is selected from the group consisting of lactic acid curd, lactic acid bacteria, rennet, rennet curd and a mixed curd; and
   d) ripening said low fat paste while maintaining a pH of about 5 or less over approximately ⅔ of the composition of said cheese paste, said ripened cheese paste having a fat content relative to the dry matter of less than or equal to 50%.

2. The process as claimed in claim 1, wherein said paste is selected from the group consisting of a soft paste, a blue veined paste or goat's milk paste.

3. The process as claimed in claim 1, including the step of molding said paste with washed mold or mixture surface mold.

4. The process as claimed in claim 1, wherein said gelatin solution and said starter are added and dispersed in said low fat milk or low fat milk residue at substantially the same time.

5. The process as claimed in claim 1, wherein said paste is formed using a lactic acid curd.

6. The process as claimed in claim 1, wherein said activator is a latic acid bacteria or curd.

7. A process for making a low fat cheese or low fat cheese specialty from a low fat milk or low fat milk residue such that said cheese or cheese specialty is sliceable and has an impression of homogeneity and freshness without having a chalky consistency and aftertaste, said process comprising the steps of ultrafiltrating said low fat milk or milk residue to produce a low fat milk liquor; adding and dispersing a gelatin solution into said milk liquor, before said milk liquor begins to coagulate, in as homogeneous manner as possible to create a low fat milk blend, said gelatin solution is selected from the group consisting of carrageenates, gelatin, guar, carob, xanthan or mixtures thereof; maintaining said blend at a nongelling temperature at or about 20° C. to prevent said gelatin solution from solidifying in said blend; simultaneously adding with said gelatin solution a starter selected from the group consisting of lactic acid bacteria, lactic acid curd, rennet, rennet curd and a mixed curd to produce a paste having a fat content relative to the dry matter of less than or equal to 50%; lightly ripening said paste at a pH of less than or equal to 5.0 over approximately ¾ of said paste; and draining and brining said paste.

8. A process as claimed in claim 7, wherein said gelatin solution is only a gelatin.

9. The process as claimed in claim 7, wherein said paste is selected from the group consisting of a fresh paste, a blue veined paste or goat's milk paste.

* * * * *